(12) United States Patent
Okada

(10) Patent No.: US 6,980,699 B1
(45) Date of Patent: Dec. 27, 2005

(54) IMAGE COMBINING AND OUTPUTTING APPARATUS THAT ADJUSTS THE BALANCE BETWEEN THE IMAGES BEING COMBINED

(75) Inventor: Satoru Okada, Toyokawa (JP)

(73) Assignee: Minolta Co., Ltd., Osaka (JP)

( * ) Notice: Subject to any disclaimer, the term of this patent is extended or adjusted under 35 U.S.C. 154(b) by 492 days.

(21) Appl. No.: 09/614,584

(22) Filed: Jul. 12, 2000

(30) Foreign Application Priority Data

Jul. 13, 1999 (JP) ............................ 11-198763

(51) Int. Cl.[7] ............................ G06K 9/36; G06K 9/32; H04N 1/46
(52) U.S. Cl. ................. 382/284; 382/294; 358/537
(58) Field of Search .................. 382/284, 293–298; 358/1.2, 1.9, 537–538

(56) References Cited

U.S. PATENT DOCUMENTS 4,978,226 A   12/1990  Moriya et al. ............... 358/76
5,267,333 A *  11/1993  Aono et al. ................. 382/166
5,371,610 A *  12/1994  Sugawa ....................... 358/434
6,222,637 B1    4/2001  Ito et al.
6,222,947 B1 *  4/2001  Koba ......................... 382/284

FOREIGN PATENT DOCUMENTS

JP        07-298123      11/1995
JP         9-269999      10/1997

* cited by examiner

Primary Examiner—Bhavesh M. Mehta
Assistant Examiner—Duy M. Dang
(74) Attorney, Agent, or Firm—Burns, Doane, Swecker & Mathis, LLP

(57) ABSTRACT

When combining a plurality of original images, an image combining and outputting apparatus adjusts the balance of the original images to facilitate the outputting of a favorable combined image. Suitable size information 5013 is stored as attribute information 501 of a background image 500 whose size is not to be adjusted. The size of the input image is adjusted by magnifying or reducing the input image so that the size becomes equal to the size given in the suitable size information 5013. The adjusted input image is then combined with the background image to produce a combined image that is outputted.

12 Claims, 8 Drawing Sheets

Fig.4A

| | 5013 |
|---|---|
| CLOSE-UP | 300,000 |
| HALF | 200,000 |
| FULL | 150,000 |

Fig.4B

| | 5014 |
|---|---|
| CLOSE-UP | $(X_1, Y_1)$ |
| HALF | $(X_2, Y_2)$ |
| FULL | $(X_3, Y_3)$ |

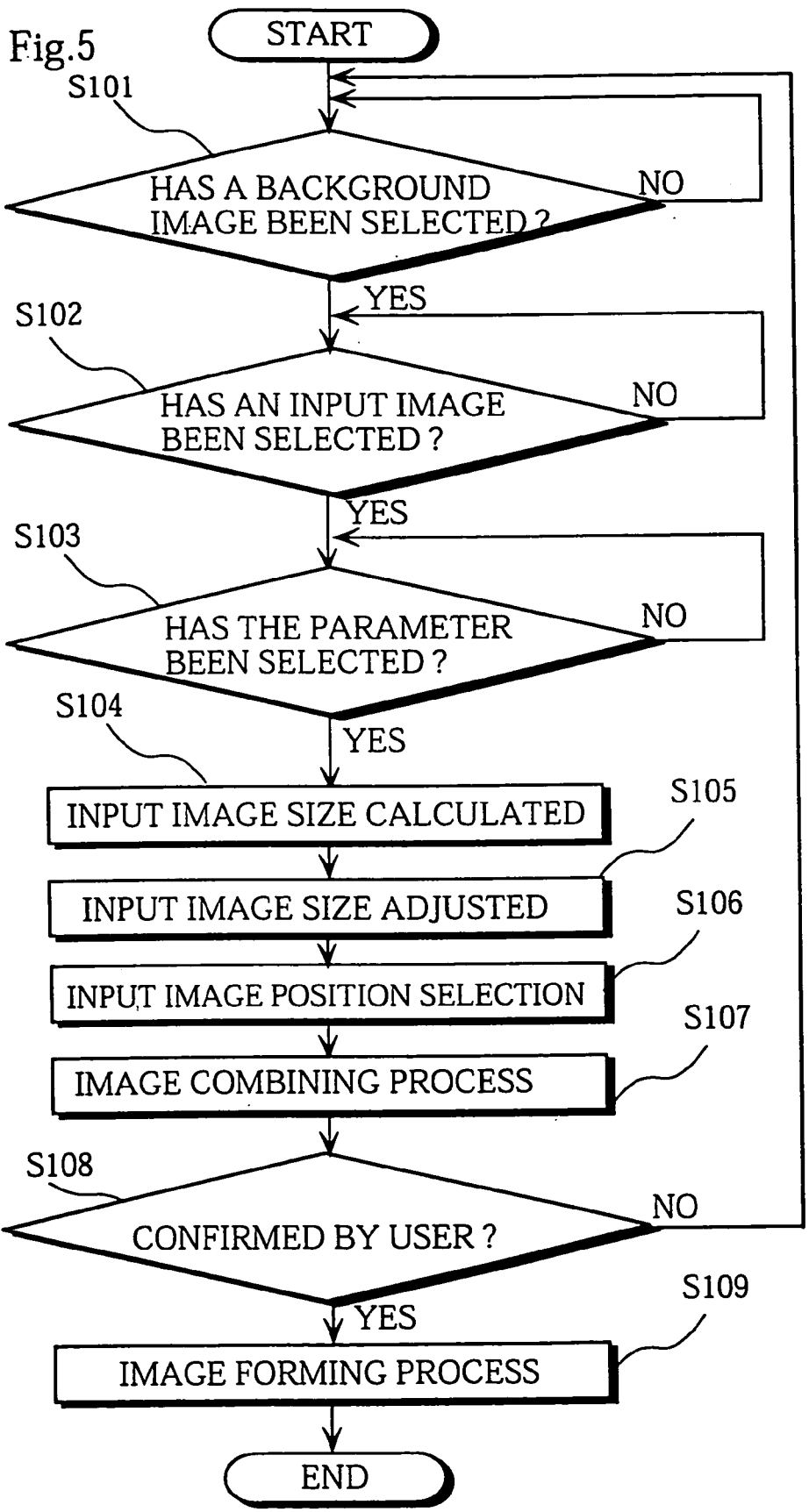

IMAGE COMBINING AND OUTPUTTING APPARATUS THAT ADJUSTS THE BALANCE BETWEEN THE IMAGES BEING COMBINED

This application is based on application No. 11-198763 filed in Japan, the content of which is hereby incorporated by reference.

BACKGROUND OF THE INVENTION (1) Field of the Invention

The present invention relates to an image combining and outputting apparatus that combines a plurality of source images into a combined image that is then outputted.

(2) Description of Related Art

In recent years, a number of image combining and outputting apparatuses have been developed and set up in a variety of locations. These apparatuses enable users to combine pictures taken using a digital camera, or other photographic means, with other types of images, such as photographs, designs, and characters. Such combined images are displayed on a screen, and are outputted by printing them onto a medium such as paper in accordance with user instructions.

The following describes how a user operates this kind of image combining and outputting apparatus.

First, users stand at the appropriate spot and operate control buttons (or the like) that are suitably positioned to be within the users' reach. The apparatus then takes a photo of the users and displays it on a display means.

Next, the users select an image (hereinafter "frame") that is to be combined with the users' photo. A number of such frames are provided in advance. The apparatus combines the users' photo with the selected frame and displays the resulting image (hereinafter "combined image") on the display means.

The users can have a number of combined images produced by combining their photo with different frames, and then instruct the apparatus to output the users' favorite combined image. The apparatus outputs this combined image by printing it onto a medium such as paper. In some cases, it is possible for the users to have their photo retaken a number of times.

When using a conventional apparatus, however, users are not able to adjust the size of their own images within the combined image. This means that there are many cases where the balance (hereinafter "image balance") between the frame and the figures in the combined image is poor. To improve the image balance, users of conventional apparatuses have had to reposition themselves closer to or further from the photographic means and retake the photo. This makes conventional apparatuses difficult to use.

As one potential solution, Japanese Laid-Open Patent Application No. H07-298123 discloses an apparatus with a function for adjusting the size of an image to be combined with another image. This adjustment has to be performed by the user. This makes the operation of the apparatus complicated, and limits its potential usage. Some image combining and outputting apparatuses are intended to be set up in public places, and so will be used by people of all ages. As some members of the public have problems operating machines, such people will find it difficult to adjust the sizes of images.

SUMMARY OF THE INVENTION

The present invention was conceived in view of the stated problem with the related art, and has an object of providing an image combining and outputting apparatus that can combine and output images with favorable image balance, while still being easy to use.

The stated object can be achieved by an image combining and outputting apparatus that combines a plurality of original images and outputs a combined image, including: a balance adjusting unit for adjusting balance between a plurality of original images that are to be combined; and an image combining unit for combining the plurality of original images after the balance has been adjusted by the balance adjusting unit, the balance adjusting unit including: an attribute information obtaining unit for obtaining attribute information that has been added to image data of a fixed image, the fixed image being an original image, out of the plurality of original images, whose size is not to be adjusted by the balance adjusting unit; a size information obtaining unit for obtaining size information showing an original size of at least one adjustable image, an adjustable image being an original image in the plurality of original images whose size is to be adjusted by the balance adjusting unit; and a size adjusting unit for adjusting the size of at least one adjustable image, based on the attribute information obtained by the attribute information obtaining unit and the size information obtained by the size information obtaining unit.

The above construction enables images to be combined and outputted with favorable image balance, while still being easy to use.

BRIEF DESCRIPTION OF THE DRAWINGS

These and other objects, advantages and features of the invention will become apparent from the following description thereof taken in conjunction with the accompanying drawings which illustrate a specific embodiment of the invention.

In the drawings:

FIG. 4A shows one example of the content of the suitable size information 5013 included in the background image data 500;

FIG. 4B shows one example of the content of the input image arrangement information 5014 included in the background image data 500;

FIG. 5 is a flowchart showing the operational procedure of the control unit 100 in the first embodiment of the present invention;

DESCRIPTION OF PREFERRED EMBODIMENTS

The following describes image combining and outputting apparatuses that are embodiments of the present invention, with reference to the attached drawings.

Figure 1:
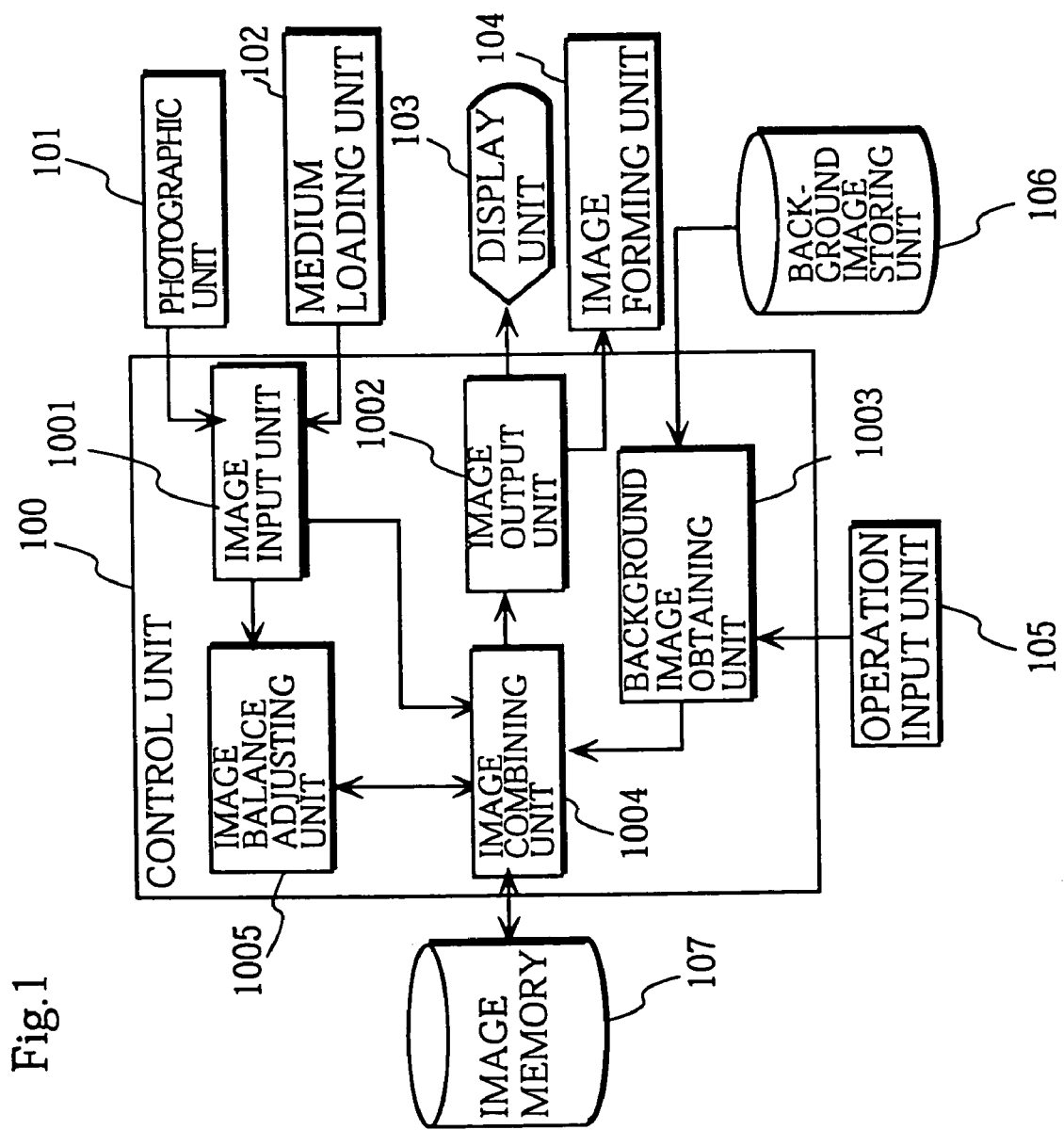
FIG. 1 is a functional block diagram showing the overall construction of an image combining and outputting apparatus according to a first embodiment of the present invention.

First Embodiment (1) Overall Construction of the Image Combining and Outputting Apparatus FIG. 1 is a functional block diagram showing the overall construction of an image combining and outputting apparatus that is one embodiment of the present invention.

As shown in the drawing, the image combining and outputting apparatus of this first embodiment includes a photographic unit 101, a medium loading unit 102, a display unit 103, an image forming unit 104, an operation input unit 105, a background image storing unit 106, and an image memory 107. Each of these components is connected to a control unit 100. The control unit 100 of the present embodiment is composed of a data processing apparatus whose principal element is a CPU (Central Processing Unit) for executing programs. The processing of the control unit 100 includes the following functional elements: an image input unit 1001; an image output unit 1002; a background image obtaining unit 1003; an image combining unit 1004; and an image balance adjusting unit 1005.

The photographic unit 101 takes a photograph of the users or whatever else is placed at the posing spot. As specific examples, a video camera or a digital camera may be used as the photographic unit 101. The image data generated when the photographic unit 101 takes a photograph is sent to the image input unit 1001.

A device capable of reading data from a storage disc, such as a floppy disk or a magneto-optical (MO) disk, or a device capable of reading data from a memory card, such as a SMART MEDIA (Registered Trademark) or Compact Flash card, may be provided as the medium loading unit 102. When the users choose not to have their picture taken by the photographic unit 101 of the image combining and outputting apparatus and instead wish to load an image taken elsewhere using a digital camera or the like, such image can be used as the original image that will be combined with a frame. In this case, image data stored on the storage medium that has been inserted in the medium loading unit 102 is sent to the image input unit 1001 and is combined with another image by the image combining unit 1004.

The display unit 103 displays a combined image produced by the image combining unit 1004 that has been outputted via the image output unit 1002. As specific examples, an LCD (liquid crystal display device) or a CRT (cathode ray tube) display device may be used as the display unit 103. The image forming unit 104 is capable of forming the combined image produced by the image combining unit 1004 on a medium such as paper, and so includes an image forming apparatus such as a printer.

Figure 2:
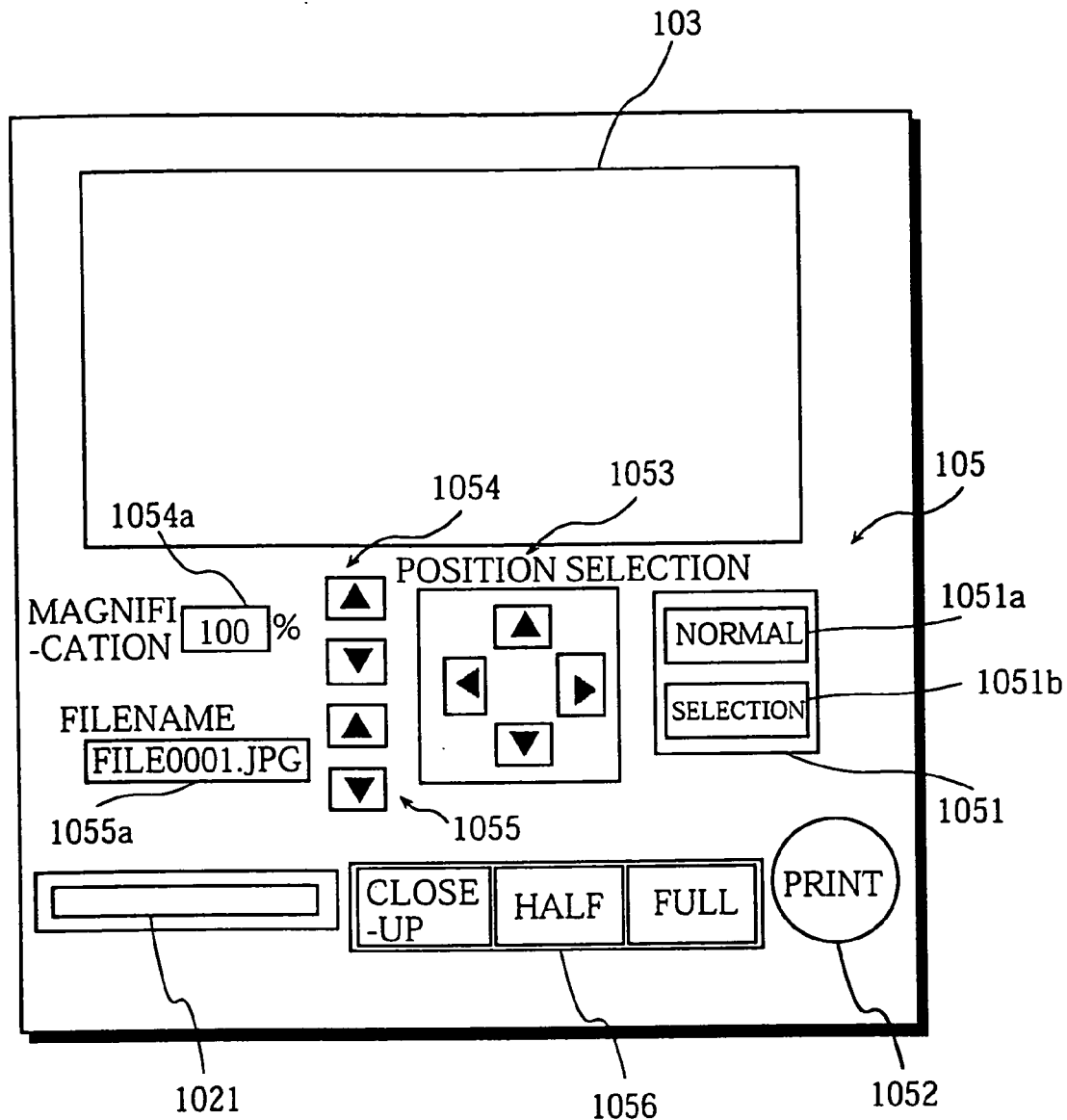
FIG. 2 shows the external appearance of one example of an operation input unit 105 that is provided in the embodiments of the present invention.

The operation input unit 105 is an input device that receives input operations made by a user standing at the posing spot. FIG. 2 shows the external appearance of one example of an image combining and outputting apparatus that includes the operation input unit 105 described in this embodiment. In this drawing, the operation buttons provided below the display unit 103 compose the operation input unit 105. Note that the operation input unit 105 of the present embodiment is not merely composed of an input device and includes a means for displaying some of the selections made by the user for confirmation purposes.

The following describes the various parts of the operation input unit 105.

Numeral 1051 in FIG. 2 shows the mode setting buttons that are used for setting the operation mode for the entire image combining and outputting apparatus of the present embodiment. The mode setting buttons 1051 include a normal mode setting button 1051a and a background image selection mode setting button 1051b. The image combining and outputting apparatus is usually set in normal mode, so that the normal mode setting button 1051a is illuminated, though when the user has pressed a different button, the button in question will be illuminated to show that the selected operation mode is being used.

The background image selection mode setting button 1051b is pressed by the user to place the image combining and outputting apparatus into a mode (hereinafter, "background image selection mode") that allows the user to select the background image to be combined with the input image. When the image combining and outputting apparatus is placed into background image selection mode, a variety of background images may be arranged on the display unit 103 to allow the user to select a desired background image. This user selection can be made via the position selection buttons 1053, for example.

A print button 1052 is provided below the mode setting buttons 1051. By pressing the print button 1052, the user can have image formation performed for a combined image currently displayed on the display unit 103. The paper or other medium on which the image has been formed is then discharged into a collection tray (not illustrated).

The position selection buttons 1053 are made up of four arrow keys that respectively indicate up, down, left, and right. In addition to being used to make the selection of a background image during the background image selection mode described above, these keys can be used when the user wishes to manually adjust the position of the input image within the combined image.

As described later, magnification setting buttons 1054 are provided to enable the user to manually set the magnification used for the input image. The magnification setting buttons 1054 include up and down arrow buttons, with the user being able to raise and lower the magnification by pressing the up and down arrow buttons, respectively. The current setting of the magnification is displayed by a magnification display unit 1054a for confirmation purposes.

Numeral 1055 shows the filename scroll buttons. The filename scroll buttons 1055 are used when a storage medium such as a floppy disk has been inserted into a medium insertion slot 1021 of the medium loading unit 102 that is provided below the operation input unit 105. By pressing the up and down arrow buttons that compose the filename scroll buttons 1055, the user can have the display in a filename display unit 1055a scroll through the filenames of the files stored on the inserted storage medium.

The present embodiment describes the case where image data stored in a file with the filename displayed in the filename display unit 1055a is treated as the input image. This input image is combined with a selected background image to produce the combined image displayed on the display unit 103. However, the image data read from the storage medium may be treated as a background image that is to be combined with a photograph of the user or users that is taken by the photographic unit 101.

The operation input unit 105 of the present embodiment also includes image combining parameter selection buttons 1056. In the present embodiment, the image combining parameter selection buttons 1056 are made up of three buttons that allow the image combining parameter to be set at any one of "close-up", "half" (for an upper-body portrait) or "full" (for a full-length portrait). Like the mode setting buttons 1051, the button corresponding to the current setting is illuminated. These image combining parameter selection buttons 1056 are described in detail later in this specification.

The background image storing unit 106 stores one or more sets of background image data. Note that the background images do not need to be stored within the image combining and outputting apparatus itself, and can be obtained as necessary via a wired or wireless network, or from a storage medium as mentioned earlier. When the image combining and outputting apparatus obtains the background images through communication with another device, a communication device such as a modem or terminal adapter (TA) should preferably be provided. The image memory 107 is a standard memory that is used by the image combining unit 1004 when combining images.

The following describes the various functional units of the control unit 100. The image input unit 1001 obtains the input image from the photographic unit 101 or the medium loading unit 102 and sends the input image to the image combining unit 1004 or the image balance adjusting unit 1005. Note that the input image is not restricted to being a photograph taken by the photographic unit 101 or an image read from a storage medium such as a floppy disk, and can instead be an image obtained via a communication network or an image read using a scanner.

The image output unit 1002 sends the combined image produced by the image combining unit 1004 to the display unit 103 or the image forming unit 104.

When the background image selection mode has been set via the operation input unit 105, the background image obtaining unit 1003 obtains the image data for the required background image from the background image storing unit 106 and sends the image data to the image combining unit 1004. As mentioned earlier, in background image selection mode background images are arranged on the screen of the display unit 103. In normal mode, a selected background image is supplied for image combining with the input image.

Figure 3:
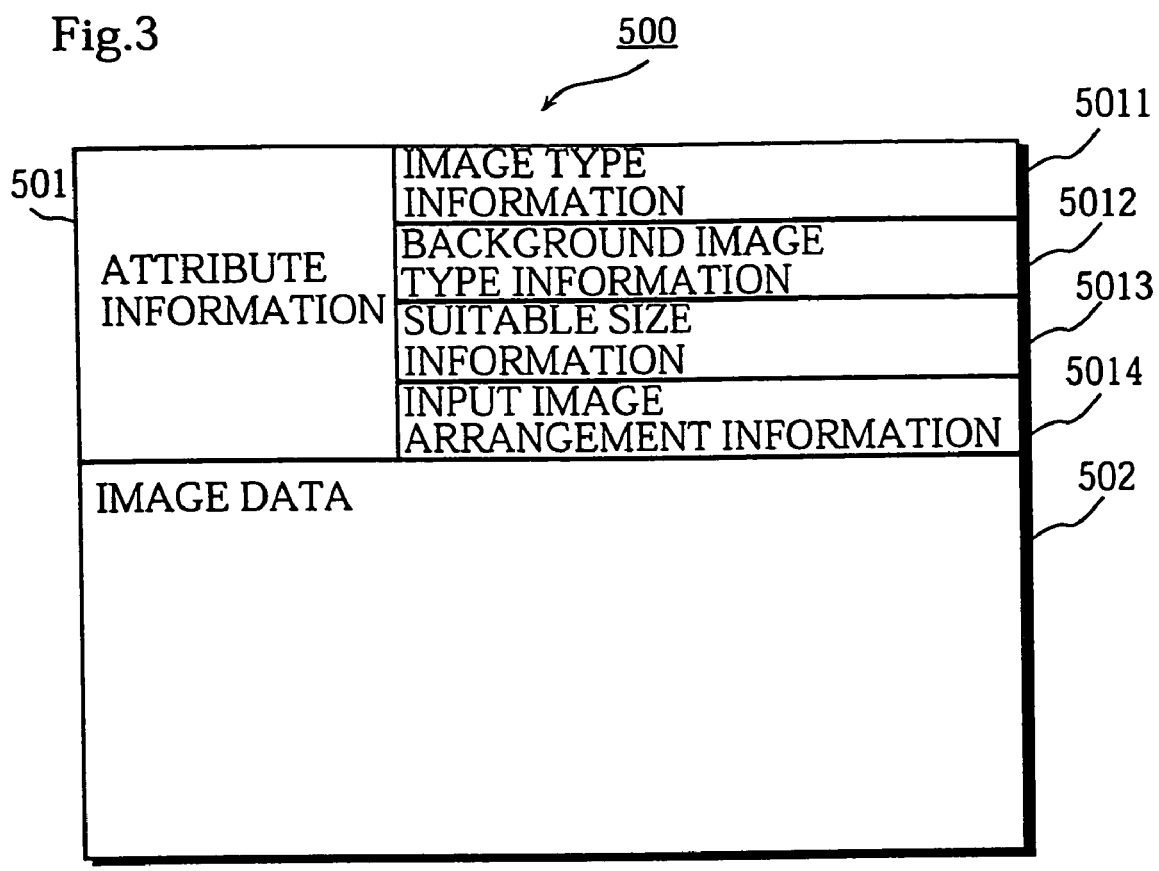
FIG. 3 shows one example of the content of the background image data 500 in these embodiments.

In the present embodiment, the background images include attribute information for use when automatically adjusting the image balance. FIG. 3 shows one example of the data content of the background image data used in the present embodiment. As shown in the drawing, background image data 500 includes the attribute information 501 in addition to ordinary image data 502. The attribute information 501 includes image type information 5011, background image type information 5012, suitable size information 5013, and input image arrangement information 5014.

The image type information 5011 shows that this background image data 500 is for a background image, i.e., image data whose size cannot be changed during the automatic adjustment of image balance. In the present embodiment, a distinction is made between the background image and the input image (i.e., an image whose size can be changed during the automatic adjustment of image balance) to assist the image balance adjusting unit 1005 in the automatic adjustment of image balance. However, if there is a clear distinction between the storage locations used for the background image and the input image, such image type information 5011 does not need to be provided.

The background image type information 5012 shows an image type for the background image data 500. This image type shows what kind of image, such as scenery (nature), scenery (town), portrait (couple), and portrait (group), is represented by the background image data 500. In background image selection mode, this information is referred to when arranging the background images on the display unit 103. The display unit 103 can therefore display background images of the same image type in rows or columns, which makes it easier for the user to select a desired background image. While not included in the present embodiment, the image combining and outputting apparatus may also be equipped with selection buttons for selecting a desired type of background image.

The suitable size information 5013 shows suitable sizes for an input image that is to be combined with this background image. These sizes respectively correspond to the three settings of input image type (close-up, half, and full) that can be indicated as the image combining parameter mentioned earlier. FIG. 4A shows one example of the content of the suitable size information 5013. This drawing shows the suitable number of pixels in the input image corresponding to the possible settings (close-up, half, and full) of the combining image parameter. These numbers are used according to the method described later in this specification.

The input image arrangement information 5014 shows suitable arrangement positions for the input image to be combined with the background image represented by the background image data 500. This input image arrangement information 5014 gives a separate arrangement position for each type of input image that can be set according the image combining parameter. As shown in FIG. 4B, the arrangement positions can be given as coordinates for the top-left corner of the input image as a position within the background image, for example. This enables the image combining and outputting apparatus to automatically determine the position of the input image when combining images.

During background image selection mode, the image combining unit 1004 generates a screen image showing various background images for display on the display unit 103. During normal mode, the image combining unit 1004 combines the selected background image with the input image and outputs the resulting combined image to the image output unit 1002. When the user presses the print button 1052, the image combining unit 1004 sends the combined image produced from the input image and the background image to the image output unit 1002 to have the image forming unit 104 perform image formation for the combined image.

The image balance adjusting unit 1005 is provided to improve the image balance between the input image and the background image and does so by changing the size (i.e., magnifying or reducing) of the input image. In the present embodiment, the image balance adjusting unit 1005 automatically adjusts the image balance without the user making any operations. The method using to adjust the image balance is also described later.

(2) Processing by the Control Unit 100

The following describes the processing by the control unit 100 in the present embodiment. FIG. 5 is a flowchart showing the procedure executed by the control unit 100. First, the control unit 100 waits for the user to input a selection of a background image (S101). This selection can be made, for example, by displaying a number of background images to the user on the display unit 103 and having the user input an indication of a desired image using the position selection buttons 1053, though a variety of other selection methods are also possible.

Figure 6A:
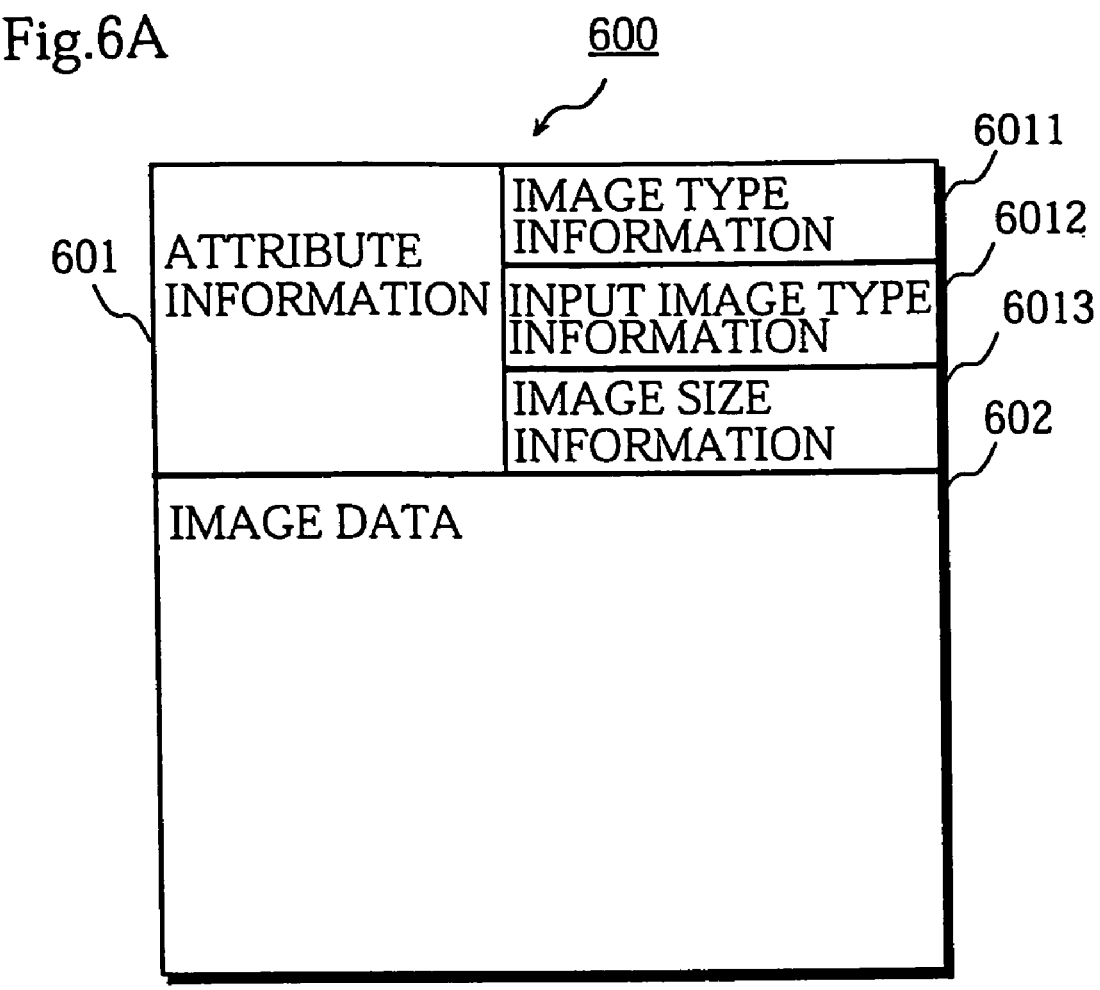
FIG. 6A shows one example of the content of the input image data 600 in the embodiments of the present invention.
Figure 6B:
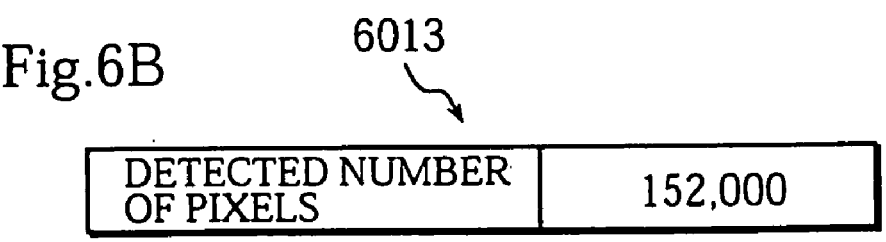
FIG. 6B shows one example of the content of the image size information 6013 in the input image data 600.

Once the user has selected a background image (S101: Yes), the control unit 100 waits for the user to select the input image (S102). This input image may be obtained by having the photographic unit 101 take the user's photograph, by inputting image data from a storage medium, or by obtaining image data from a communication network. The following describes the content of the input image data used in the present embodiment. FIGS. 6A and 6B show examples of the input image data used in the present embodiment.

As shown in FIG. 6A, the input image data 600 used in the present embodiment has a similar content to the background image data 500 that was shown in FIG. 3. The input image data 600 differs from the background image data 500 in that the input image data 600 includes input image type information 6012 in place of the background image type information 5012, image size information 6013 in place of the suitable size information 5013, and no input image arrangement information 5014.

The image combining parameter selected by a user is stored as the input image type information 6012. This means that one of "close-up", "half" and "full" is stored in the present embodiment. As mentioned earlier, this setting is made when the user makes a selection using the operation input unit 105.

As shown in FIG. 6B, a number of pixels detected in the present input image is set as the image size information 6013 used in the present embodiment. This number is detected using a predetermined method, which is described later. As shown in FIG. 6B, the detected number of pixels is a single value that does not correspond to any particular type of image, unlike the values given in the suitable size information 5013 in the background image data 500. This is because the present embodiment distinguishes between the background image and input image using the attribute information and adjusts the image balance by changing the size of the input image and not the background image. The image type information 6011 is the same as the image type information 5011 in the background image data 500 that was described earlier, so that no further explanation will be given.

Returning to the procedure shown in FIG. 5, the control unit 100 next waits for a selection of the image combining parameter for the input image (S103). In the present embodiment, the image combining parameter can be set at "close-up" to show that the input image includes only the face(s) of the user(s), "half" to show that input image includes only the upper body (bodies) of the user(s), or "full" to show that the input image is a full-length portrait of the user(s). As stated earlier, this selection is made by the user pressing one of the image combining parameter selection buttons 1056, and results in the selected information being set in the input image data as the input image type information 6012.

When a user has selected the image combining parameter (S103:Yes), the control unit 100 calculates the size of the input image (S104). In the present embodiment, the control unit 100 does this by detecting the outline of the subject(s) in the input image, calculating the number of pixels occupied by the area in the outline, and setting the resulting value as the size of the input image. The number of pixels found in this way is then written in the input image data 600 as the image size information 6013.

In more detail, the size of the input image received by the image input unit 1001 and sent to the image combining unit 1004 is calculated by the image combining unit 1004 and the resulting value is set as the image size information 6013 in the input image data 600. Note that in the present embodiment, when a user inputs an input image via the medium loading unit 102 whose resolution differs to the resolution of the photographic unit 101, conversion may be performed on the input image to set its resolution equal to that of the photographic unit 101. This is because differences in resolution between the input image and the assumed resolution used by the control unit 100 can lead to differences in the setting of the image size information 6013, even when the area occupied by the subject(s) includes the same number of pixels. This would result in the control unit 100 incorrectly detecting the size of the input image. By converting the resolution of the input image, such problems are avoided.

Next, the control unit 100 instructs the image balance adjusting unit 1005 to adjust the size of the input image (S105). This input image size adjustment results in the input image adjusted to the suitable size for favorable balance with the background image, and means that the image balance between the background image and the input image is adjusted automatically.

The following describes a specific example of the adjustment to the image size of the input image. When the image combining parameter selected in step S103 is "half", the image balance adjusting unit 1005 refers to the suitable size information 5013 in the selected background image data.

A suitable number of pixels for the image combining parameter "half" is set in advance in the suitable size information 5013, as shown in FIG. 4A. When the number of pixels corresponding to the image combining parameter "half" is set at 200,000 pixels as in FIG. 4A and the detected number of pixels in the input image is 152,000 pixels as shown in FIG. 6B, the magnification factor to be used for adjusting the input image can be found according to Equation 1 below.

$$200,000/152,000 \approx 1.32 \qquad \text{Equation 1}$$

As a result, the image balance adjusting unit 1005 instructs the image combining unit 1004 to magnify the input image by a factor of 1.32. In more detail, 1.147 is found as the approximate square root of 1.32 and the input image is magnified by a factor of 1.147 in both the horizontal and vertical directions to adjust the image balance.

The control unit 100 then selects the position of the input image (S106). This image selection process determines the position in the background image for inserting the input image. Once the size adjustment has been performed, the input image can be inserted at the position shown by the coordinates given by the input image arrangement information 5014.

After the position selecting process, the image combining unit 1004 performs the actual combining of the input image and the background image (S107). In the present example, the image combining unit 1004 receives the result of the size adjustment process, magnifies the input image by a factor of 1.147, and then inserts the resized input image into the background image at the position indicated by the input image arrangement information 5014 to combine the input image with the background image.

If the user presses the print button 1052 to confirm the combined image (S108:Yes), the control unit 100 has image formation performed (S109). This process forms an image on paper or another medium based on the combined image data produced by the image combining process, and is executed by an image forming apparatus, such as a printer, that is provided as the image forming unit 104.

As described above, the image combining and outputting apparatus of the present embodiment refers to attribute information that is stored in advance and adjusts an input image to a suitable size before combining it with a background image. As a result, a user can have the device print a combined image with favorable balance between the background image and input image without manually setting the magnification factor for adjusting the input image. This makes the operation of the image combining and outputting apparatus very simple.

Second Embodiment

The following describes a second embodiment of the present invention. While the first embodiment always adjusts the image balance automatically, there will be some cases where a suitable automatic adjustment will not be possible or where the combined image produced by the automatic adjustment appears strange to the user. For this reason, this second embodiment allows the user to make fine adjustments to the size and positioning of images.

Figure 7:
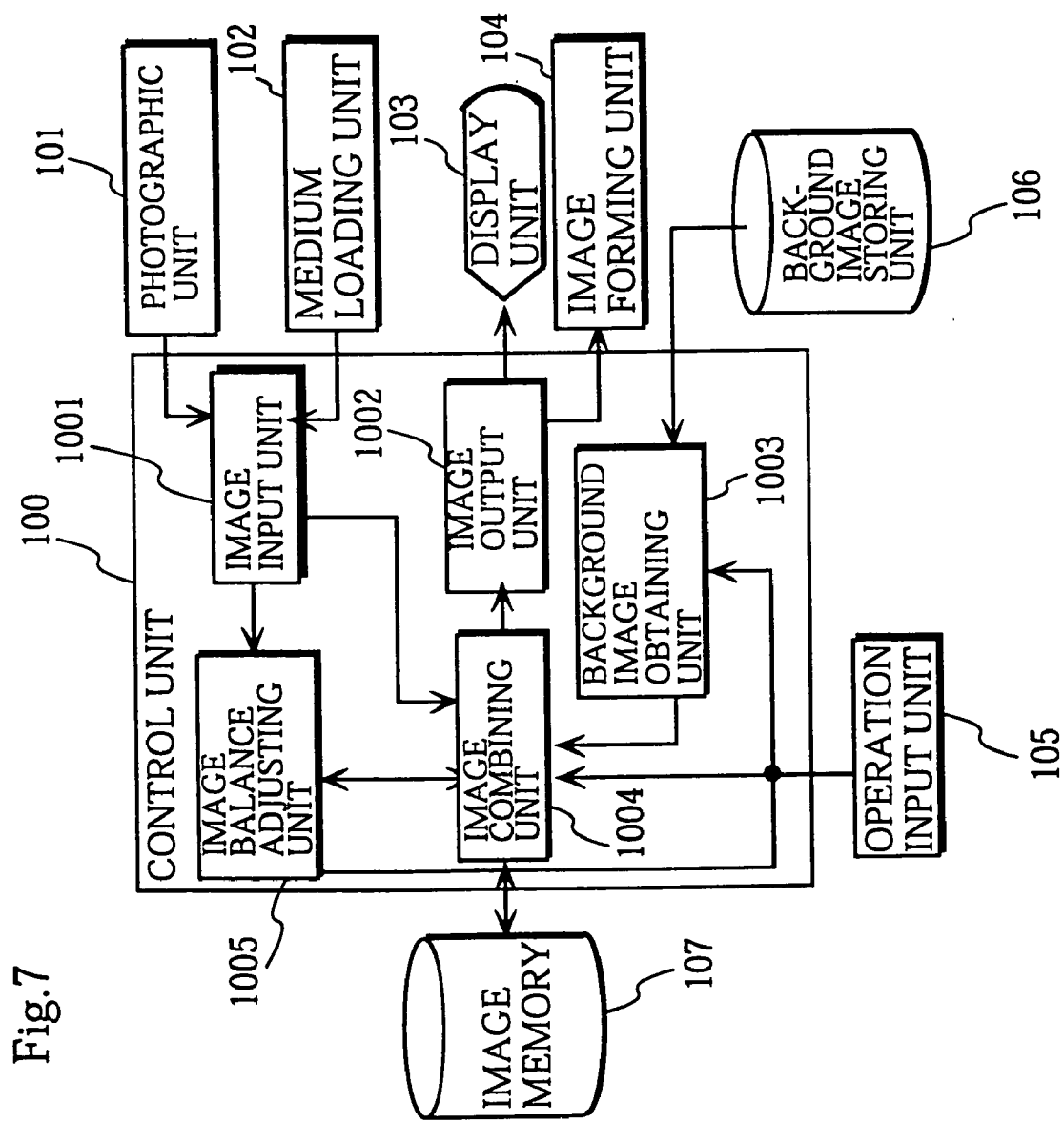
FIG. 7 is a functional block diagram showing the overall construction of an image combining and outputting apparatus according to a second embodiment of the present invention.

FIG. 7 is a functional block diagram showing the construction of the image combining and outputting apparatus in this second embodiment. As shown in the drawing, the image combining and outputting apparatus of the second embodiment has largely the same construction as that of the first embodiment, but differs in that inputs made via the operation input unit 105 are also sent to the image balance adjusting unit 1005. This enables the user to manually adjust the image balance. The processing performed by the control unit 100 in the second embodiment also differs to that explained earlier. The following description focuses on these differences with the first embodiment.

Figure 8:
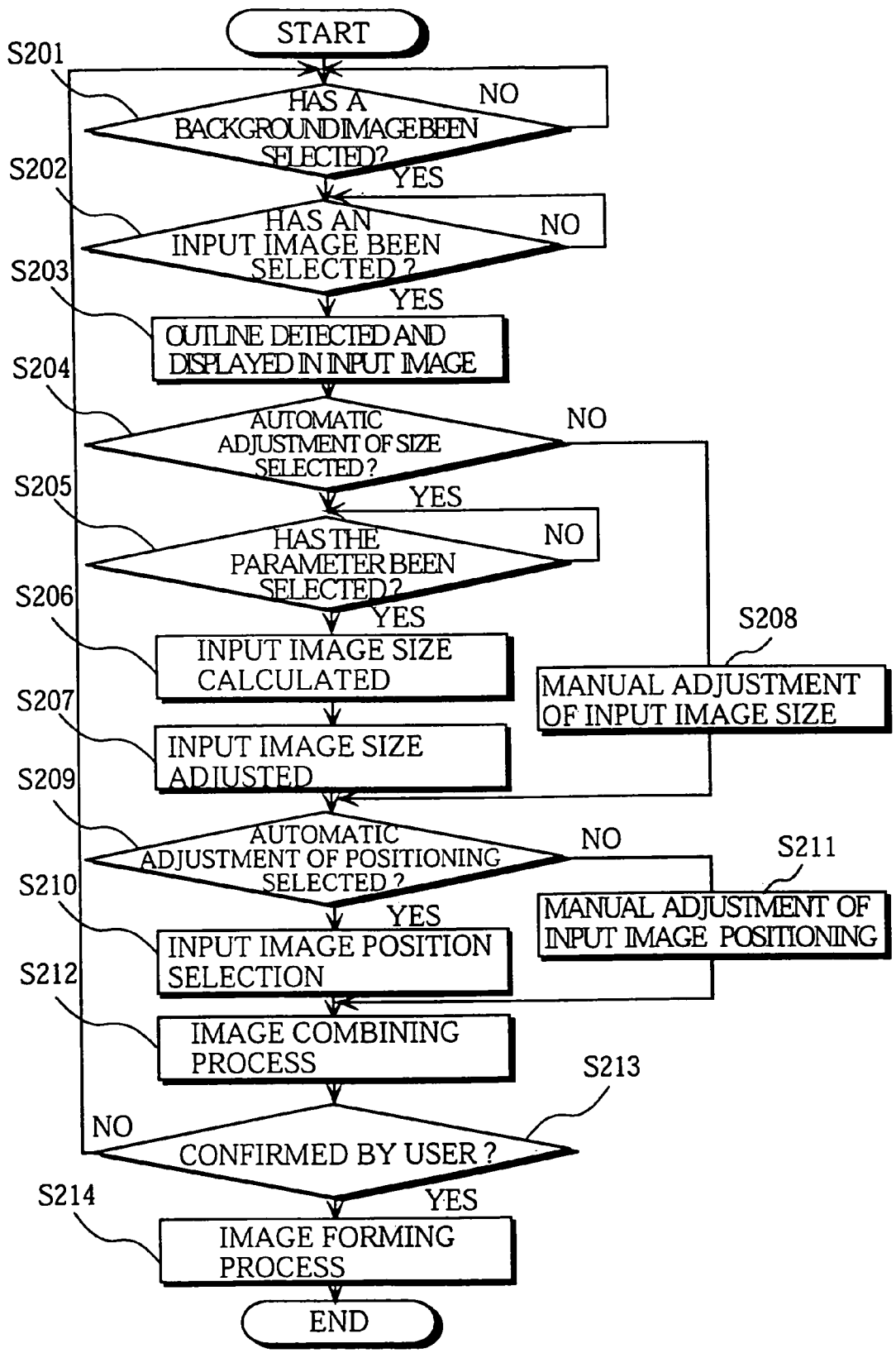
FIG. 8 is a flowchart showing the operational procedure of the control unit 100 in the second embodiment of the present invention.

FIG. 8 is a flowchart showing the procedure executed by the control unit 100 in this second embodiment. After the selection of the input image (S202), the control unit 100 of this second embodiment detects the outline of the input image and has the detected outline displayed on the display unit 103 (S203). This enables the user to get a rough idea of how the input image will be arranged into the background image. On viewing this image, the user selects whether the adjustment of image balance is to be performed automatically (S204).

When the user chooses to have the image balance adjusted automatically (S204:Yes), the procedure continues with steps S205 to S207 that feature the same processing as in the first embodiment. However, when the user chooses not to have image balance adjusted automatically (S204:No), a manual adjustment to the input image size is received (S208). Such manual adjustments can be made by the user pressing the magnification setting buttons 1054. Such buttons 1054 provide input to the control unit 100, which includes an amendment indication input receiving unit.

The procedure continues with the user selecting whether the adjustment of the positioning of the input image is to be performed automatically (S209). In the first embodiment, the image combining and outputting apparatus automatically adjusts the positioning of the input image having referred to the input image arrangement information 5014, though there will be cases where this does not result in the input image being arranged at the user's desired position. For this reason, the present embodiment also allows the user to adjust the positioning of the input image manually.

When the user chooses to have the positioning of the input image adjusted automatically (S209:Yes), the procedure continues with step S210 that features the same processing as in the first embodiment. However, when the user chooses not to have image positioning adjusted automatically (S209: No), a manual adjustment to the positioning of the input image is performed by the user pressing the position selection buttons 1053, for example (S211).

In this second embodiment, an outline in the input image is displayed in step S203 is detected and displayed to give the user a rough idea of the position of the subjects in the input image. This helps the user when adjusting the positioning of the input image.

Once the size and positioning of the input image have been adjusted as described above, an image combining process (S212) is performed in the same way as in the first embodiment. If the user then confirms the combined image (S213:Yes), an image forming process (S214) is performed.

The present image combining and outputting apparatus enables the user to select whether adjustment of the image balance and the positioning of the input image in the combined image is to be performed automatically according to the approximate size of the input image or manually according to user operations. This allows the apparatus to cope with cases where the user does not like the results of an automatic adjustment on the images. Note that while the above explanation describes the case where an outline is detected and displayed in the input image in step S203, this processing can be omitted and the input image may instead be displayed in its original form.

Modifications

While the present invention has been described by way of the two embodiments given above, it should be obvious that the scope of the invention is not limited to the specific details given therein. Several representative modifications to the above embodiments are given below.

(1) While the above explanation deals with the case where two images are combined, three or more images may be combined by an image combining and outputting apparatus.

As a specific example, an image combining and outputting apparatus may facilitate the combining of a number of input images, whose sizes may be changed, with a number of background images, whose sizes are fixed. The image combining parameter for an input image whose size may be adjusted is not limited to the three settings of "close-up", "full", and "half" that are given in the above embodiments, so that a variety of other settings may be used. Cases where there are a plurality of input images whose input image parameters have been set differently can be managed by providing suitable size information for each image combining parameter in each background image in advance.

(2) In the above embodiments, a photograph of the user(s) taken by the photographic unit or an image stored in advance as a background image is used as the input image. This is not a limitation for the present invention, however. Such images may be obtained in a variety of ways, such as from a storage medium or via a network to which the apparatus is connected. The background images are also not limited to images of scenery or people. Any kind of image may be used.

(3) The above embodiments describe the case where the number of pixels in the area surrounded by the outline detected in an image is stored as the content of the image size information 6013 and numbers of pixels are stored as the content of the suitable size information 5013. However, size information does not need to be stored in this way, so that various kinds of information may be used. As examples, the size may be expressed as the length of a diagonal or the distance between two characteristic points which, when the input image is a close-up, may be the user's eyes or ears. The content of the attribute information may also be changed in accordance with factors such as where the image combining and outputting apparatus is installed or the content of background image. While this may make the operation of the image combining and outputting apparatus more complex, the user may also be allowed to select how the attribute information is used.

Although the present invention has been fully described by way of examples with reference to the accompanying drawings, it is to be noted that various changes and modifications will be apparent to those skilled in the art.

Therefore, unless such changes and modifications depart from the scope of the present invention, they should be construed as being included therein.

What is claimed is:

1. An image combining and outputting apparatus that combines a plurality of original images and outputs a combined image, comprising:
   a balance adjusting unit for adjusting balance between a plurality of original images that are to be combined; and
   an image combining unit for combining the plurality of original images after the balance has been adjusted by the balance adjusting unit;
   the balance adjusting unit including:
   an attribute information obtaining unit for obtaining attribute information that has been added to image data of a fixed image, the fixed image being an original image, out of the plurality of original images, whose size is not to be adjusted by the balance adjusting unit;
   a size information obtaining unit for obtaining size information showing an original size of at least one adjustable image, and adjustable image being an original image in the plurality of original images whose size is to be adjusted by the balance adjusting unit; and
   a size adjusting unit for adjusting the size of at least one adjustable image, based on the attribute information obtained by the attribute information obtaining unit and the size information obtained by the size information obtaining unit;
   wherein the attribute information includes a post-adjustment size to be used for the adjustable images, and the size adjusting unit makes the sizes of the at least one adjustable image approximately equal to the post-adjustment size shown by the attribute information.

2. An image combining and outputting apparatus according to claim 1, further comprising
   a selection input receiving unit for receiving a user selection of an image combining parameter that is assigned in advance to each adjustable image,
   wherein the attribute information includes a plurality of pairs, each pair showing one setting of the image combining-parameter and a corresponding post-adjustment size, and the size adjusting unit makes the sizes of the at least one adjustable image approximately equal to the post-adjustment size corresponding to the selected image combining parameter selected by the user for each adjustable image.

3. An image combining and outputting apparatus according to claim 2,
   wherein the attribute information includes at least one arrangement position at which an original image is to be positioned during image combining, each arrangement position being associated with a different setting of the image combining parameter.

4. An image combining and outputting apparatus according to claim 1,
   wherein the attribute information includes information showing an arrangement position into which an original image is to be positioned during image combining.

5. An image combining and outputting apparatus according to claim 1,
   wherein the plurality of original images to be combined consist of a background image whose size is not to be adjusted and in input image whose size is changed as necessary in accordance with the background image.

6. An image combining and outputting apparatus that combines a plurality of original images and outputs a combined image, comprising;
   a balance adjusting unit for adjusting balance between a plurality of original images that are to be combined; and
   an image combining unit for combining the plurality of original images after the balance has been adjusted by the balance adjusting unit;
   the balance adjusting unit including:
   an attribute information obtaining unit for obtaining attribute information that has been added to image data of a fixed image, the fixed image being an original image, out of the plurality of original images, whose size is not to be adjusted by the balance adjusting unit;
   a size information obtaining unit for obtaining size information showing an original size of at least one adjustable image, and adjustable image being an original image in the plurality of original images whose size is to be adjusted by the balance adjusting unit;
   a size adjusting unit for adjusting the size of at least one adjustable image, based on the attribute information obtained by the attribute information obtaining unit and the size information obtained by the size information obtaining unit;
   an amendment indication input receiving unit which receives an indication showing that at least one of a size and a position of at least one original image are to be amended within a combined image;
   wherein when the amendment indication input receiving unit has received an indication showing that a size of at least one original image is to be adjusted, the balance adjusting unit adjusts the sizes of the at least one original image in accordance with the indication; and
   when the amendment indication input receiving unit has received an indication showing that a position of at least one original image is to be adjusted, the image combining unit adjusts the positions of the at least one original image in accordance with the indication.

7. An image combining and outputting apparatus, comprising:
   an image combining means for combining a first image and a second image;
   an attribute information obtaining means for obtaining attribute information that is appended to the first image;
   a size information obtaining unit for obtaining size information that is appended to the second image; and
   a size adjusting means for adjusting the size of the second image based on the attribute information and the size information when the image combining means performs image comprising:
   wherein the attribute information includes second size information showing a post-adjustment size for the second image;

the size adjusting means magnifying or reducing the second image to make the size of the second image approximately equal to the post-adjustment size shown by the second size information.

8. An image combining and outputting apparatus according to claim 7, further comprising an operation unit for indicating an image type of the second image, the second size information being changed in accordance with the image type of the second image indicated by the operation unit.

9. An image combining and outputting apparatus according to claim 7, wherein the attribute information includes position information showing a position for arranging the second image during the image combining, the image combining means arranging the second image at the position shown by the second size information when combining the first image and the second image.

10. An image combining and outputting apparatus according to claim 7, further comprising:

a mode setting means for setting a user mode where the size of the second image is changed according to a user operation; and a changing means for stopping, when the user mode has been set, the size adjusting means from adjusting the size of the second image and for changing the size of the second image in accordance with the user operation.

11. An image combining and outputting apparatus according to claim 7, further comprising:

an outline extracting means for extracting an outline in the second image; and a display device for displaying the outline extracted from the second image together with the first image.

12. An image combining method for combining a first image and a second image, comprising:

an attribute information obtaining step for obtaining attribute information that is appended to the first image;

a size information obtaining step for obtaining size information that is appended to the second image;

a size adjusting step for adjusting the size of the second image based on the attribute information and the size information; and an image combining step for combining the first image with the second image whose size has been automatically adjusted in the size adjusting step;

wherein the attribute information includes a second size information showing a post-adjustment size for the second image;

the size adjusting step magnifying or reducing the second image to make the size of the second image approximately equal to the post-adjustment size shown by the second size information.

* * * * *